United States Patent

[11] 3,634,750

[72] Inventor Powell O. Bobo
 Pittsburgh, Pa.
[21] Appl. No. 31,295
[22] Filed Apr. 23, 1970
[45] Patented Jan. 11, 1972
[73] Assignee Westinghouse Electric Corporation
 Pittsburgh, Pa.

[54] REGULATOR APPARATUS RESPONSIVE TO GENERATOR OUTPUT POWER FACTOR AND VOLTAGE
 4 Claims, 2 Drawing Figs.

[52] U.S. Cl.................................................... 322/20,
 322/24, 322/28, 322/59
[51] Int. Cl....................................................... H02p 9/14
[50] Field of Search.......................................... 322/20, 24,
 28, 36, 59

[56] References Cited
 UNITED STATES PATENTS

| | | | |
|---|---|---|---|
| 2,558,572 | 6/1951 | Logan .......................... | 322/20 |
| 2,672,585 | 3/1954 | Hotson ......................... | 322/20 |

*Primary Examiner*—Benjamin Dobeck
*Assistant Examiner*—H. Huberfeld
*Attorneys*—A. T. Stratton, F. E. Browder and Donald R. Lackey ABSTRACT: Regulator apparatus for a synchronous machine having a field winding, and terminals connected to an electrical system. The regulator apparatus utilizes the power factor at the terminals of the synchronous machine to control the excitation of the field winding during normal circuit conditions, and the voltage at the terminals to control the excitation during system voltage disturbances.

PATENTED JAN 11 1972 3,634,750

INVENTOR
Powell O. Bobo

BY
Donald R. Lackey
ATTORNEY

REGULATOR APPARATUS RESPONSIVE TO GENERATOR OUTPUT POWER FACTOR AND VOLTAGE

BACKGROUND OF THE INVENTION

1. Field of the Invention

The invention relates in general to regulator apparatus, and more specifically to regulator apparatus for synchronous machines, such as alternating current generators.

2. Description of the Prior Art

It is common practice for electric utilities to selectively connect alternating current generators to their electrical systems during peak load conditions, with these peaking units, such as gas turbine generators, usually having a KVAR or reactive power capacity which is small relative to the system requirements at the point of connection. Since these peaking units have a limited ability to control voltage due to their relatively small KVAR capacity, power factor regulation of these generators is usually preferable to voltage regulation.

Power factor regulators, however, during a system voltage disturbance, can initiate undesirable corrective action. For example, during a system short circuit fault, the alternating current generator feeds VARS into the fault. The power factor regulator, in an attempt to maintain the preset power factor, reduces the field excitation which reduces the voltage at the output terminals of the generator. Thus, the field excitation is reduced by the power factor regulator at the very time that it should be increased in order to maintain terminal voltage sufficient to provide fault current for relay or fuse time coordination, and also for purposes of transient stability. Thus, while it is desirable to operate the peaking generators with power factor control, it would also be desirable to provide field forcing during system voltage disturbances.

SUMMARY OF THE INVENTION

Briefly, the present invention is new and improved regulator apparatus for a synchronous machine, such as an alternating current generator, which regulates the power factor at the output terminals of the generator, while providing field forcing during voltage disturbances. Signals responsive to the output voltage and power factor are both provided by the apparatus, with the signal responsive to power factor controlling the excitation until a voltage disturbance occurs, at which time the voltage regulator signal takes preference over the power factor signal, to force the field for at least a period of time sufficient for associated protective apparatus to operate properly.

In one embodiment of the invention, the generator power factor is regulated by a power factor regulator operating through a voltage regulator, by using the power factor regulator to adjust the voltage magnitude to be regulated by the voltage regulator. The voltage regulator is selected to have a faster response time than the power factor regulator-voltage adjuster combination, thus providing only voltage regulation during the delay time between the response of the voltage regulator and the response of the power factor regulator in changing the magnitude to be regulated by the voltage regulator.

In another embodiment of the invention, a power factor regulator and a minimum voltage limiter are connected to control the field excitation current through an auctioneering circuit. The power factor regulator directly controls the field current magnitude until the output voltage of the generator drops to a predetermined minimum magnitude, at which time the minimum voltage limiter provides a signal which is preferred by the auctioneering circuit to the signal provided by the power factor regulator. Thus, the field current is controlled by the minimum voltage limiter during the disturbance to force the field and provide the short circuit current required by associated protective apparatus.

BRIEF DESCRIPTION OF THE DRAWINGS

Further advantages and uses of the invention will become more apparent when considered in view of the following detailed description of exemplary embodiments thereof, taken with the accompanying drawings, in which.

DESCRIPTION OF PREFERRED EMBODIMENTS

Figure 1:
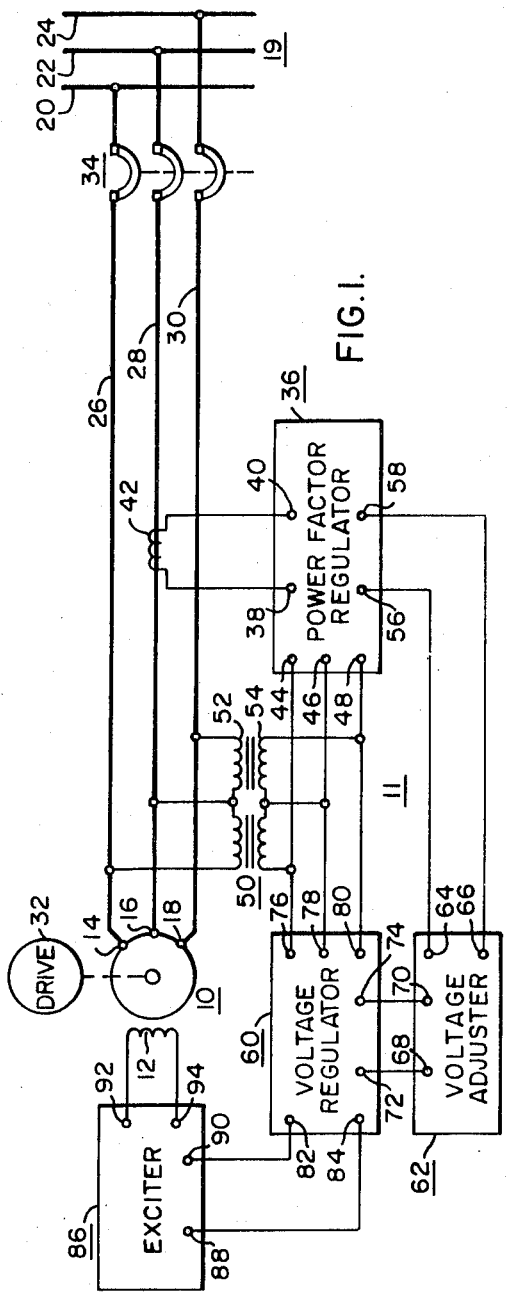
FIG. 1 is a schematic diagram of regulator apparatus for a synchronous machine, constructed according to a first embodiment of the invention.
Figure 2:
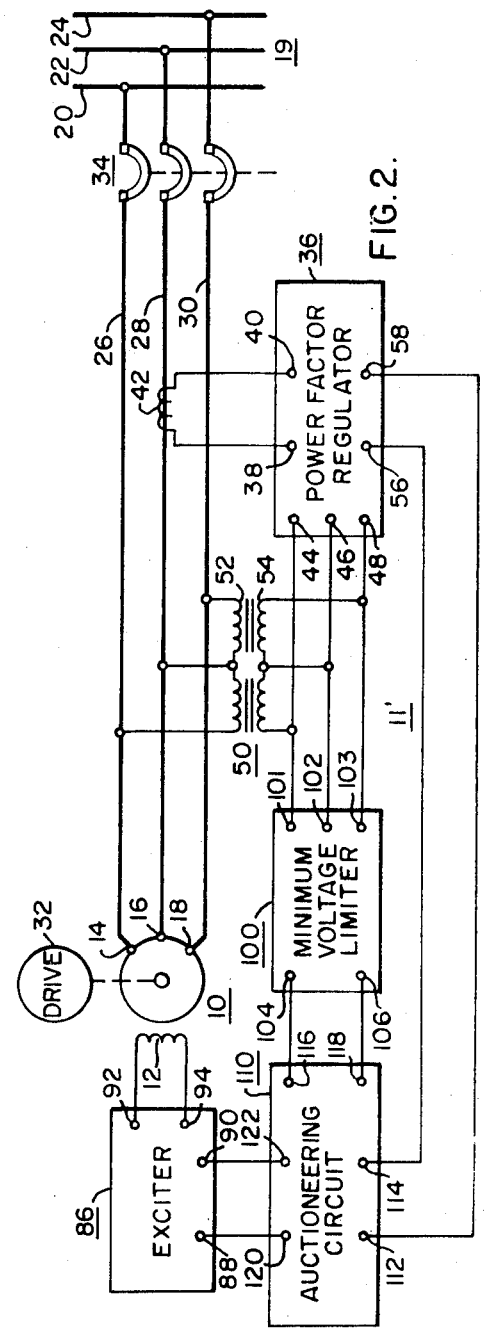
FIG. 2 is a schematic diagram of regulator apparatus constructed according to another embodiment of the invention.

The invention is new and improved regulator apparatus which provides excitation current in response to the power factor at the terminals of a synchronous machine, and provides field forcing during voltage disturbances. While the regulator apparatus may be used with any synchronous machine, it will be assumed, for purposes of example, that the synchronous machine is an alternating current generator. Broadly, the regulator apparatus includes first means adapted to provide a first signal responsive to the power factor at the output terminals of the alternating current generator, second means adapted to provide a second signal responsive to the voltage at the output terminals of the alternating current generator, and third means which is connected to both the first and second means which provides a third signal responsive to the first signal during normal circuit conditions, and to the second signal during a system voltage disturbance. The excitation current for the field winding of the alternating current generator is provided by fourth means with the fourth means being connected to the third means to enable the third signal to control the magnitude of the excitation current provided by the fourth means. Thus, the alternating current generator is under power factor control during normal circuit conditions, with the output voltage of the generator rising and falling as required to maintain a predetermined power factor at the output terminals of the generator, and it is under voltage control during a system voltage disturbance. When the system voltage drops due to a disturbance, such as a short circuit on the system, the field current is increased by the voltage control, thus forcing the generator field and maintaining short circuit current for a period of time sufficient to operate associated protective apparatus. For disturbances which are of limited duration, too short to operate the protective apparatus, the voltage control at this time improves the transient stability of the generator, enabling it to ride over minor voltage disturbances without corrective action by the power factor signal. FIGS. 1 and 2 are schematic diagrams which illustrate two embodiments of the invention.

More specifically, FIG. 1 is a schematic diagram of an alternating current generator 10 with regulator apparatus 11 constructed according to the teachings of the invention. Alternating current generator 10 has a field excitation winding 12 and output terminals 14, 16 and 18 connected to supply alternating current energy to the main electrical system 19, represented by conductors 20, 22 and 24, via a feeder bus represented by conductors 26, 28 and 30, and a circuit breaker 34. The alternating current generator 10 is driven by a suitable prime mover or drive 32, such as a steam or gas turbine, or water wheel.

A power factor regulator 36 is provided which is adapted to obtain signals from the output terminals of generator 10 responsive to the power factor, and provide an output signal responsive to the deviation of the power factor from a predetermined value. A power factor regulator which may be used is disclosed in U.S. Pat. No. 3,427,471, which is assigned to the same assignee as the present application.

Power factor regulator 36 has input terminals 38 and 40 which are connected to a current transformer 42 disposed to obtain a measure of the current flowing in the feeder bus, such as through conductor 42, and input terminals 44, 46 and 48 connected to a potential transformer 50. Potential transformer 50 obtains a measure of the output terminal voltage of generator 10, and it has a primary winding 52 connected to conductors 26, 28 and 30, and a secondary winding 54 connected to input terminals 44, 46 and 48 of the power factor regulator 36. A signal responsive to the deviation of the power factor at the output terminals of the generator 10 from a predetermined value, is provided at output terminals 56 and 58 of the power factor regulator 36. Thus, referring to the broad statement of the invention, the first means includes the power factor regulator 36, and the second means includes the potential transformer 50. The third means, which is connected to the first and second means in this embodiment, is a voltage regulator 60 and voltage adjuster 62. The fourth means is an exciter 86 connected to the field winding 12.

Voltage regulator 60 has input terminals 76, 78 and 80 connected to the secondary winding 54 of a potential transformer 50, to receive a measure of the output terminal voltage of alternating current generator 10, input terminals 72 and 74 connected to voltage adjuster 62, and output terminals 82 and 84. Voltage regulator 60 compares the terminal voltage of the generator 10 with the reference voltage set by the voltage adjuster 62, and provides an output signal at its output terminals 82 and 84 responsive to any difference, and this output signal is used to control the magnitude of the excitation current applied to the field winding 12 by the exciter 86, to regulate the output voltage to the value set by the voltage adjuster 62. The output terminals 82 and 84 of voltage regulator 60 are connected to input terminals 88 and 90 of exciter 86, with exciter 86 being of the rotating, or static type, as desired, and the exciter 86 has output terminals 92 and 94 which are connected to the field excitation winding 12 of the alternating current generator 10.

The regulator apparatus 11, however, under normal system conditions is not a voltage regulator, as the input terminals 64 and 66 of the voltage adjuster 62 are connected to the output terminals 56 and 58, respectively, of the power factor regulator 36. The error signal appearing at the output terminals 56 and 58 of the power factor regulator 36 is used to set the voltage adjuster 62 and as the error signal from the power factor regulator 36 changes, the voltage adjuster changes the magnitude the voltage regulator 60 regulates to, up or down, depending upon the polarity of the error signal from the power factor regulator. The power factor regulator 36 changes the output terminal voltage of the generator 10, as required, to maintain the desired power factor at the output terminals of the generator 10. Thus, regulator apparatus 11 is basically a power factor regulator. Since regulator apparatus 11 is basically a power factor regulator, generator 10 may be connected to the electrical system 19 even though the KVAR capacity of generator 10 is small compared with the system requirements at the point of connection, as generator 10 will not be called upon, under normal circuit conditions, to maintain a predetermined voltage. In other words, the regulated output voltage is changed up or down, as required, to maintain a predetermined power factor. Power factor control is desirable for generators with limited KVAR capacity, but during a system voltage disturbance, such as a short circuit, the generator 10 feeds VARS or reactive power into the fault, and the power factor regulator would then call for an immediate reduction in the excitation current to maintain the predetermined power factor. During a system fault or disturbance, however, it is undesirable to reduce the excitation current and thus the output voltage of the generator 10. In fact, field forcing or increased excitation is required to hold up the terminal voltage, at least for a time sufficient to supply short circuit current for proper operation of the associated protective apparatus. Field forcing during a voltage disturbance also improves the transient stability of the generator 10.

In the embodiment of the invention shown in FIG. 1, power factor regulation with field forcing during voltage disturbances is provided by selecting the voltage regulator 60 to have a faster response time than the combination of the power factor regulator 36 and voltage adjuster 62. Upon a system voltage disturbance which tends to reduce the output voltage of generator 10, the voltage regulator increases the field excitation current to hold up the voltage to the value set by the voltage adjuster 62, without interference from the power factor regulator 36, until the power factor regulator 36 and voltage adjuster 62 respond to the change in power factor. The difference in response time is selected to provide the time required for the protective apparatus to operate. A suitable voltage regulator which may be used, and which has a response time of well under one second, is disclosed in U.S. Pat. No. 3,302,097, which is assigned to the same assignee as the present application. The voltage adjuster means 62 may be a motor operated rheostat. A motor operated rheostat has an inherently slow response time, such as 15 seconds from one end of the rheostat control range to the other. Since during a system disturbance the power factor regulator will demand a large change in the setting of the rheostat, several seconds will elapse before the voltage adjuster significantly changes the setting, allowing more than adequate time for the operation of the protective apparatus. During transient voltage disturbances, only the voltage regulator 60 will respond, as by the time the power factor regulator 36 and voltage adjuster 62 start to respond, the disturbance will be terminated.

FIG. 2 is a schematic diagram of an alternating current generator 10 with regulator apparatus 11' constructed according to another embodiment of the invention. Like reference numerals in FIGS. 1 and 2 indicate like components. Regulator apparatus 11' includes a potential transformer 50 and power factor regulator 36, as hereinbefore described relative to FIG. 1. Instead of regulating the power factor of generator 10 through a voltage regulator, however, the power factor regulator 36 in this embodiment controls the exciter 86 directly, until overridden by a voltage responsive signal during a voltage disturbance. These functions are provided by a minimum voltage limiter 100 having input terminals 101, 102 and 103, and output terminals 104 and 106, and by an auctioneering circuit 110 having input terminals 112, 114, 116 and 118, and output terminals 120 and 122. Input terminals 101, 102 and 103 of minimum voltage limiter 100 are connected to the secondary winding 54 of the potential transformer 50 in order to obtain a measure of the output terminal voltage of the alternating current generator 10. Output terminals 104 and 106 of minimum voltage limiter 100 are connected to input terminals 116 and 118, respectively, of auctioneering circuit 110. The remaining input terminals 112 and 114 of auctioneering circuit 110 are connected to the output terminals 56 and 58 of the power factor regulator 36. Output terminals 120 and 122 of the auctioneering circuit 110 are connected to the input terminals 88 and 90, respectively, of the exciter 86.

The minimum voltage limiter 100 obtains a measure of the output terminal voltage of generator 10 from potential transformer 50, and it compares this signal with a reference signal set to correspond to a predetermined minimum voltage. When the output terminal voltage of generator 10 drops to this predetermined minimum voltage magnitude, limiter 100 provides an output signal at its terminals 104 and 106 which is preferred by the auctioneering circuit 110 over the signal provided by power factor regulator 36. While the auctioneering circuit 110 may operate to select one signal over another in many different ways, for purposes of example control by the more positive of the two signals will be described. Thus, when the output voltage 10 drops to the minimum voltage magnitude, limiter 100 provides an output signal which is more positive than the signal provided by the power factor regulator 36. The power factor regulator 36 at this time will be calling for reduced excitation, while the minimum voltage limiter 100 will be calling for increased excitation to hold the predetermined minimum output voltage. The minimum voltage limiter 100 may be similar to a voltage regulator, with the reference and terminal voltage signals being applied to a diode, for example, such that the diode is back biased until the terminal voltage drops to the predetermined minimum magnitude, at which time it will be forward biased, allowing a control signal to be provided at its output terminals.

The output terminals of the power factor regulator 36 and of the minimum voltage limiter 100 are connected to auctioneering circuit 110, which may include parallel connected diodes arranged to pass the more positive of the signals applied thereto. Thus, during normal conditions, the output signals from the power factor regulator 36 are passed through the auctioneering circuit to the exciter 86, allowing direction control of the excitation of the field winding 12 according to the power factor at the output terminals of generator 10. During a system voltage disturbance which drops the terminal voltage of generator 10 to the predetermined minimum magnitude preset on the minimum voltage limiter 100, the minimum voltage limiter 100 applies a signal to auctioneering circuit 110 which is preferred by the auctioneering circuit to the signal from the power factor regulator 36, and the auctioneering circuit 110 applies this signal to the exciter 86, to increase the field excitation current in an attempt to maintain the predetermined minimum voltage magnitude set by the limiter 100.

In the embodiment of the invention shown in FIG. 2, the first means is the power factor regulator 36, similar to the first embodiment shown in FIG. 1, but the second means includes the potential transformer 50 and the minimum voltage limiter 100, instead of just the potential transformer 50. The third means in this embodiment is the auctioneering circuit, instead of the voltage regulator and voltage adjuster, and the fourth means is the exciter 86 in both embodiments.

In summary, there has been disclosed new and improved regulator apparatus for an alternating current generator, which is especially suitable for connecting an alternating current generator to an electrical system, wherein the generator has a relatively small capacity to provide reactive power to the system, compared with the system requirements at the point of connection. The regulator apparatus regulates the power factor at the output terminals of the generator during normal system conditions, and the disadvantages of power factor control during a voltage disturbance is overcome by automatically changing to voltage control during the voltage disturbance, thus providing the desired field forcing which enables associated protective apparatus to operate properly, and also to improve the transient stability of the generator.

While the new and improved regulator apparatus has been described primarily for use with an alternating current generator, it would be equally advantageous to use it with any synchronous machine, such as a synchronous motor or synchronous condenser.

I claim:

1. Regulator apparatus for an alternating current generator having a field winding, and output terminals connected to an electrical system, comprising:
   power factor regulator means adapted to obtain a signal responsive to the power factor at the output terminals of the alternating current generator, and provide an output signal responsive to any deviation of the power factor from a predetermined value,
   voltage regulator means including voltage adjusting means, adapted to obtain a signal responsive to the voltage at the output terminals of the alternating current generator and provide an output signal responsive to any deviation of the terminal voltage from that set on means voltage adjusting means,
   excitation means connected to said voltage regulator means adapted to supply excitation current to the field winding of the alternating current generator, with the magnitude of the excitation current being responsive to the output signal of said voltage regulator means,
   said power factor regulator means being connected to said voltage adjusting means, regulating the power factor at the output terminals of the alternating current generator by adjusting the regulated magnitude,
   said voltage regulator means having a faster response time than the combination of said power factor regulator means and said voltage adjusting means, regulating the magnitude of the excitation current according to the power factor during normal conditions, and according to voltage during system voltage disturbances.

2. Regulator apparatus for an alternating current generator having a field winding, and output terminals connected to an electrical system, comprising:
   power factor regulator means adapted to obtain a signal responsive to the power factor at the output terminals of the alternating current generator, and provide an output signal responsive to any deviation of the power factor from a predetermined value,
   minimum voltage-limiting means adapted to obtain a signal responsive to the voltage at the output terminals of the alternating current generator, and provide an output signal of greater magnitude than the output signal provided by said power factor means, when the voltage at the output terminals of the alternating current generator drops below a predetermined minimum magnitude,
   auctioneering means connected to said power factor regulator means and to said minimum voltage-limiting means, providing an output signal responsive to the larger of the signals provided thereby,
   and excitation means connected to said auctioneering means, adapted to supply excitation current to the field winding of the alternating current generator, with the magnitude of the excitation current being responsive to the output signal provided by said auctioneering means.

3. Regulator apparatus for a synchronous machine having a field winding, and terminals connected to an electrical system, comprising:
   first means adapted to provide a first signal responsive to the deviation of the power factor at the terminals of the machine from a predetermined magnitude,
   second means including a potential transformer adapted to provide a second signal responsive to the voltage at the terminals of the machine,
   third means including a voltage regulator with voltage-adjusting means, said voltage-adjusting means and said voltage regulator being connected to said first and second means, respectively, said voltage regulator having a faster response time than the combination of said first means and said voltage-adjusting means, said third means providing a third signal responsive to said second signal during a disturbance on the electrical system, and otherwise responsive to said first signal, due to said different response times,
   and fourth means adapted to supply excitation current to the field winding, said fourth means being connected to said third means, with the magnitude of the excitation current provided by said fourth means being responsive to said third signal.

4. Regulator apparatus for a synchronous machine having a field winding, and terminals connected to an electrical system, comprising:
   first means adapted to provide a first signal responsive to the deviation of the power factor at the terminals of the machine from a predetermined magnitude,
   second means including a potential transformer and minimum voltage-limiting means adapted to provide a second signal when the voltage at the terminals of the machine drops to a predetermined magnitude,
   third means including an auctioneering circuit connected to said first and second means, said auctioneering circuit selecting the signal from said minimum voltage-limiting means when it is initiated, in preference to the first signal, and otherwise selecting said first signal,
   and fourth means adapted to supply excitation current to the field winding, said fourth means being connected to said third means, with the magnitude of the excitation current provided by said fourth means being responsive to said first signal except when the voltage at the terminals of the machine drops to the predetermined minimum magnitude, at which time the magnitude of the excitation current is responsive to the second signal.

* * * * *